Figure 6:
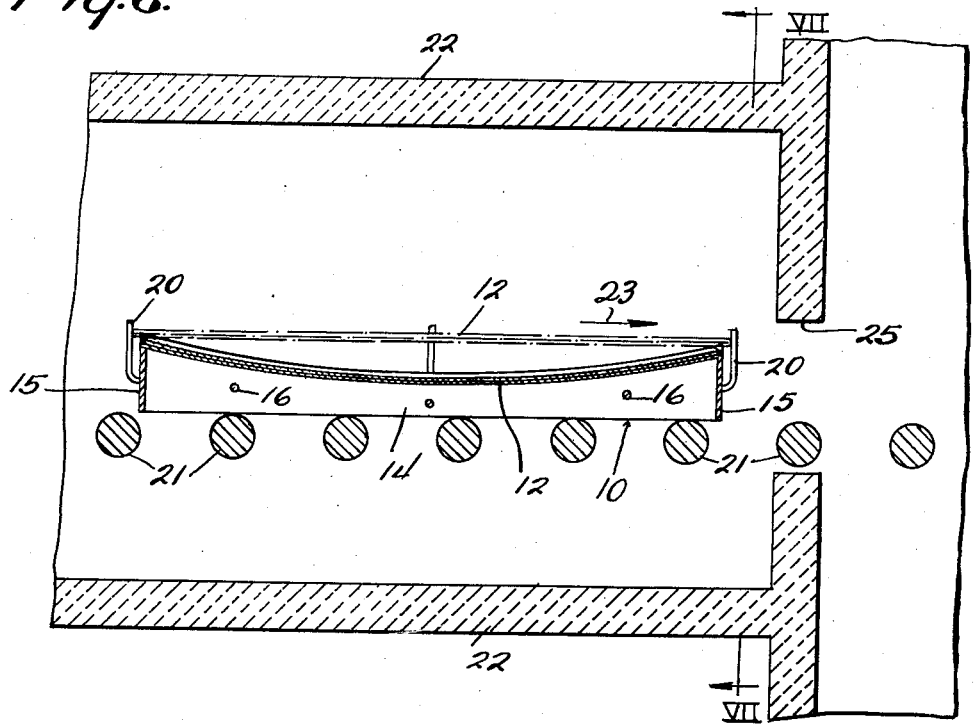

Oct. 28, 1941. H. J. GALEY 2,261,023
METHOD AND APPARATUS FOR BENDING GLASS
Filed July 11, 1939 2 Sheets-Sheet 1
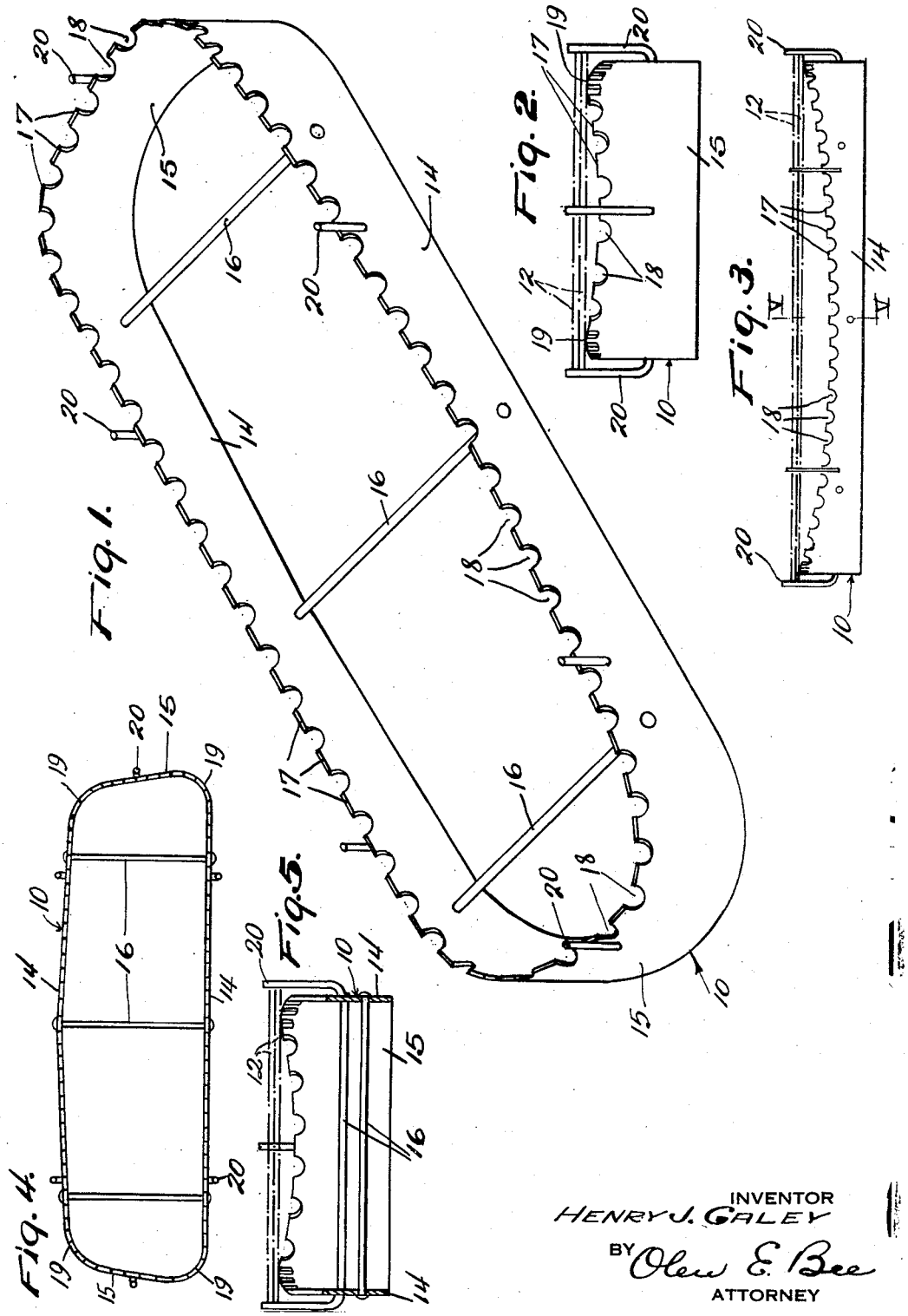
INVENTOR
HENRY J. GALEY
BY Olew E. Bee
ATTORNEY Oct. 28, 1941.  H. J. GALEY  2,261,023

METHOD AND APPARATUS FOR BENDING GLASS

Filed July 11, 1939    2 Sheets-Sheet 2

INVENTOR
HENRY J. GALEY
BY Olew E. Bee
ATTORNEY

Patented Oct. 28, 1941

2,261,023

UNITED STATES PATENT OFFICE 2,261,023

METHOD AND APPARATUS FOR BENDING GLASS

Henry J. Galey, Tarentum, Pa., assignor to Pittsburgh Plate Glass Company, Allegheny County, Pa., a corporation of Pennsylvania Application July 11, 1939, Serial No. 283,776

7 Claims. (Cl. 49—67)

This invention relates to the treating of glass sheets and it has particular relation to an improved method of and apparatus for bending glass sheets.

One object of the invention is to provide an improved method of bending glass sheets.

Another object of the invention is to provide an improved method of imparting compound curvatures to sheet glass.

Another object of the invention is to provide an improved apparatus for supporting glass sheets in connection with compound bending thereof.

In my prior patent, No. 2,021,180, I have proposed the use of a skeleton frame upon which a glass sheet can be supported and heated until it bends under the influence of its own weight into a curvature corresponding to upper edges of side frame members which extend underneath the marginal portions of the sheet. While this device serves satisfactorily to bend the glass sheet into a curvature corresponding substantially to a segment of a cylinder, it is now proposed to provide a method by which a new form of skeleton frame can be employed to insure the bending of an elongate glass sheet lengthwise and also the bending of this sheet transversely to produce a compound curvature of somewhat toroidal configuration. By properly controlling the temperature and time factors incidental to the bending or sagging of the sheet of glass and bringing the glass into a cooler atmosphere, the bending operations can be arrested at the desired point to provide predetermined compound curvatures.

Figure 7:
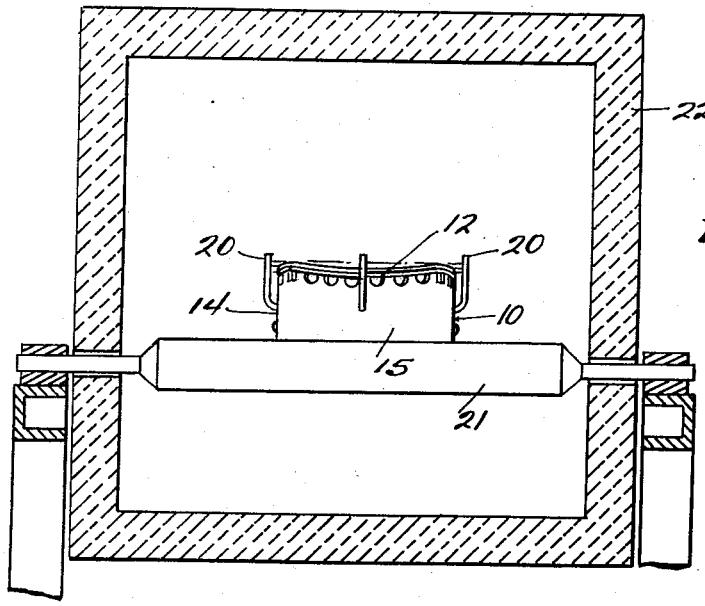

In the drawings:

Figure 1 is a perspective of a frame or mold employed in practicing the invention; Fig. 2 is an end elevation of the frame; Fig. 3 is a side elevation, on a smaller scale, of the frame; Fig. 4 is a plan of the frame; Fig. 5 is a cross section taken substantially along the line V—V of Fig. 3; Fig. 6 is a longitudinal section of a leer for heating glass; and Fig. 7 is a cross section taken substantially along the line VII—VII of Fig. 6.

In practicing the invention, a skeleton frame or mold 10 is provided for normally supporting one or more elongate glass sheets 12 in a substantially horizontal position, as shown in broken lines in Fig. 3. This frame includes elongate sheet metal side frame members 14 which are integral with sheet metal end frame members 15 and these members form a continuous wall structure open at both top and bottom. Although the frame wall is a continuous structure, the sides and ends thereof are well defined and are termed side members and end members for convenience in referring to them. Intermediate transverse braces 16 in the form of rods or long adjustable bolts are connected transversely between the side members 14 and are rigidly secured thereto to stabilize and prevent distortion of the frame. Metal or other suitable material which is resistant to heat at temperatures sufficiently high to melt the glass is employed for the construction of the frame.

The upper edges of the side members 14 are curved to provide upwardly facing molding surfaces 17 upon which the glass rests after it bends or sags longitudinally under its own weight when predetermined heat is applied thereto. The end members 15 are provided with additional upwardly facing correspondingly curved edges 17. In order to provide for air circulation and to reduce heat transmission between glass and frame, the upper frame edges are provided with notches 18 at the sides and ends thereof. At each upper corner of the frame relatively higher points 19 define the beginning of curvature of the frame longitudinally and transversely.

The remainder of the glass intermediate these points is free to bend. A number of upright guides 20 are rigidly secured at spaced intervals on the sides and ends of the frame 10 and project above the frame edges to center the glass on the upper edges of the frame preparatory to the bending operation. In the form of frame shown, the molding edge surfaces 17 follow a general rectangular contour of glass sections or panes employed in glazing motor vehicles or the like, and the glass sheets 12 are cut to conform substantially to this contour. These sheets extend outwardly beyond the inner edges of the molding surfaces 17 sufficiently to compensate for inward movement of the glass edges during bending operations. Although the ends of the glass sheets and mold are somewhat rounded at the corners, and the sides can also be curved, it is to be understood that other contours of elongate mold structure and glass can be selected according to the shape desired.

In bending the glass, a unit of one or more elongate sheets 12 is supported adjacent the four corners thereof upon the four areas 19 and the frame carrying the glass is conducted horizontally upon a conventional roller conveyor 21 which operates in a tunnel kiln or leer 22 to move the glass supporting frame 10 in the direction of the arrow 23 (Fig. 6) in a well-known manner. The glass is properly centered by the guides 20. The temperature in the leer is so controlled that each glass sheet is heated to softening temperature, which includes a critical range approximating between 800 degrees to 1300 degrees F., at which the glass sags or bends. The amount of heat and the rate of applying it can be regulated in conventional manner to control the degree or rate of bending of the glass. The opposite longitudinal edges of the sheet approach or rest upon the upwardly facing curved surfaces 17 of the side members after the glass softens and sags. When the edges of the glass reach these curved surfaces, the longitudinal bending of the sheet is arrested. Equalization of heat applied to opposite surfaces of the glass is promoted because the heated atmosphere can circulate through the notches 18.

Since the longitudinal edges of each glass sheet are supported longitudinally of the frame after being subjected to the bending operation just described, further application of heat to the sheet causes it to sag or bend transversely and to approach or assume a transverse curvature corresponding substantially to the upper curvature of the end members 15 along the surfaces 18. The central portion of the glass may have a slightly more pronounced bulge than the ends. The glass can be permitted to reach the transverse curvature defined substantially by the surfaces 18 of the end members 15 and it can be transported at such rate upon the conveyor 21 that it passes through an opening 25 at the end of the leer into a cooler atmosphere which immediately arrests the bending action. This cooler atmosphere can be established in the leer by regulating the temperature therein into hotter and cooler zones, or the glass on the frame can be transported directly out of the leer to arrest the bending in the surrounding cooler air. If desired the movement of the glass into a cooler zone or air can be timed in such manner that the bending of the glass can be arrested before it bends entirely to the depth of the curved edge surfaces 17 on the transverse end members of the frame.

When two or more sheets are bent together, they can be allowed to cool gradually or can be annealed in the leer. The movement of the glass from the zone of glass softening heat in the leer is so timed with respect to the rate of bending of the glass that the latter bends to such extent as to conform to the shape of the upper curved edges of the mold, or to approach this shape, substantially at the time the glass enters the cooler zone or leaves the leer, at which time, the glass bending is arrested by entering the cooler air. Thus the compound bending operations can be effected in a continuous movement of the glass supporting frame through the leer.

According to the procedure described, a plurality of sheets of flat glass are matched, cut to proper size, superposed in face to face contact, and then bent as above specified, and then they are annealed or allowed to cool.

Although only one form of the invention has been shown and described in detail, it will be apparent to those skilled in the art that the invention is not so limited but that various changes can be made therein without departing from the spirit of the invention or from the scope of the appended claims.

I claim:

1. A method of bending to compound curvatures an elongate flat glass sheet which comprises supporting the sheet horizontally upon spaced frame members curved longitudinally below the opposite longer edges of the sheet, heating the glass sheet to softening temperature until the sheet bends under its own weight between its ends into a curved shape and with its edges contacting the longitudinally curved frame members, further heating the bent glass sheet until it bends transversely between its longitudinal edges, and arresting the transverse bending action after the glass sheet has assumed a predetermined bent form.

2. A method of bending to compound curvatures an elongate flat glass sheet which comprises supporting the sheet horizontally upon spaced frame members curved longitudinally below opposite longer edges of the sheet, heating the glass sheet to softening temperature until the sheet bends under its own weight between its ends into predetermined bent form with its edges contacting the longitudinally curved frame members, further heating the bent sheet until it bends transversely between its longitudinal edges, and lowering the temperature of the sheet below critical bending range of glass to arrest such bending.

3. A method of bending to compound curvatures an elongate flat glass sheet upon a substantially elongate skeleton frame having upper curved edges on its spaced side frame members and upon its spaced end frame members which comprises supporting the sheet horizontally upon the corner portions of the frame members with the curved edges thereof below the edges of the sheet, heating the glass sheet to softening temperature until the sheet bends under its own weight between its ends into longitudinally curved shape and with its longitudinal edges contacting the longitudinally curved side frame members, further heating the bent glass sheet until it bends transversely between its longitudinal edges and substantially to the curvature defined by the end members, and arresting the transverse bending action substantially at the time the glass assumes the shape defined by the curved end members.

4. A method of bending to compound curvatures an elongate substantially rectangular glass sheet which comprises supporting said sheet at a point adjacent each of its four corners, heating the sheet to softening temperature until it bends under its own weight into longitudinally curved shape, supporting the longitudinal marginal portions of the sheet after they have assumed a predetermined contour, further applying heat to the sheet until it bends in curvature transversely of the longitudinally supported marginal portions, and arresting the transverse bending of the sheet after predetermined sagging thereof.

5. In a molding frame for supporting and shaping a sheet of glass under influence of glass softening temperatures, longitudinal side members having upper molding surfaces of concave form, end members shorter than the side members and having upper molding surfaces also of concave form, said side and end molding surfaces merging into higher areas at four corner portions of the frame for supporting four corner portions of a glass sheet adapted to be heated and to be bent into contact with said concave molding surfaces.

6. In a molding frame for supporting and shaping a sheet of glass under influence of glass softening temperatures, longitudinal sheet metal side members having upper molding surfaces of concave form and being notched along the length thereof, shorter sheet metal end members continuous with the side members and having upper molding surfaces also of notched concave form, said side and end molding surfaces merging into higher areas at four corner portions of the frame for supporting four corner portions of a glass sheet adapted to be heated and to be bent into contact with said concave molding surfaces.

7. In a molding frame for supporting and shaping a sheet of glass to be heated to softening temperature, a continuous sheet metal wall defining substantially vertical side and end members merging into raised glass supporting points at four corner portions thereof, the upper edge of each end and side member being of concave form to mold a glass sheet longitudinally and transversely into compound curvatures, and guiding means along the upper edges of said members for centering a glass sheet in position to be molded by the concave edges of the frame.

HENRY J. GALEY.